UNITED STATES PATENT OFFICE.

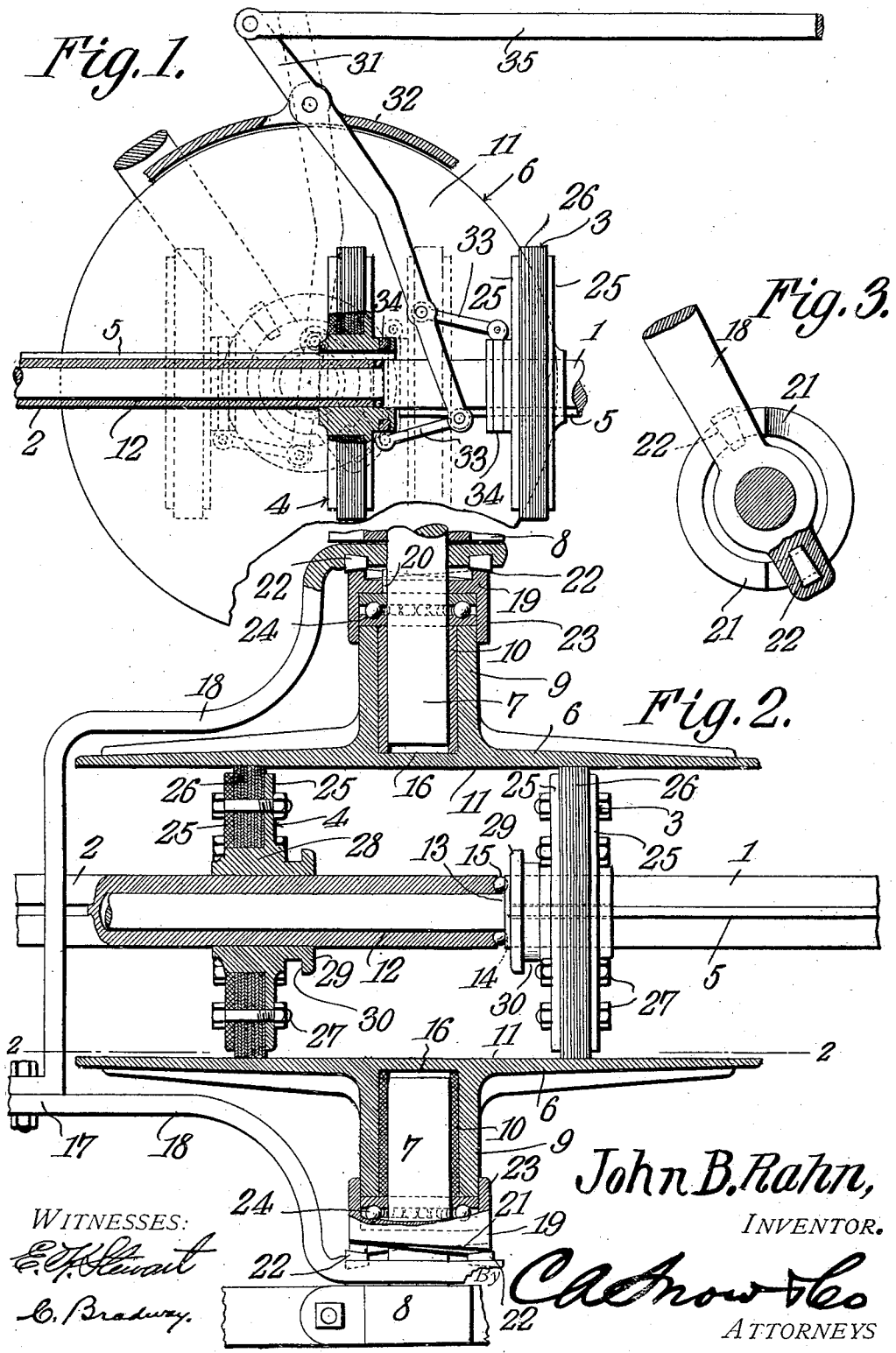

JOHN BERNHARDT RAHN, OF RACINE, WISCONSIN.

DRIVING-GEAR.

No. 870,315.

Specification of Letters Patent.

Patented Nov. 5, 1907.

Application filed November 26 1906. Serial No. 345,170.

To all whom it may concern:

Be it known that I, JOHN BERNHARDT RAHN, a citizen of the United States, residing at Racine, in the county of Racine and State of Wisconsin, have invented a new and useful Driving-Gear, of which the following is a specification.

This invention relates to power transmitting mechanism, and it relates more particularly to a change speed device of the clutch or friction type whereby the speed of rotation of the driven member of the apparatus can be varied by smooth gradations between minimum and maximum, and whereby the direction of rotation can be reversed.

A device of this character is particularly useful in a power system for self propelled vehicles for varying the speed of propulsion or the direction of travel, and obviously the invention is useful in many other connections.

The invention has for one of its objects to improve and simplify the construction and operation of change speed devices of the character specified, so as to be comparatively easy and inexpensive to manufacture and keep in repair, and reliable and efficient in operation.

The invention has as a further object to provide a simple actuating mechanism for the clutching elements so as to throw the change speed device into or out of operation.

A further object is to so construct the various parts of the device that they can be easily assembled or disassembled for the purpose of inspection, repair, or renewal.

With these objects in view, and others, as will appear as the nature of the invention is better understood, the invention comprises the various novel features of construction and arrangement of parts, to be more fully described hereinafter and set forth with particularity in the claims appended hereto.

In the accompanying drawing, which illustrates one of the embodiments of the invention, Figure 1 is a vertical longitudinal section of the device taken on the line 2—2 of Fig. 2. Fig. 2 is a central horizontal section of the device showing parts thereof in operation. Fig. 3 is a detail view of one of the means for clutching the parts of the gear together.

Corresponding parts in the several figures are indicated throughout by similar characters of reference.

Referring to the drawing, 1 designates a driving shaft and 2 a driven shaft, which are suitably mounted, as are the other parts of the device, on the frame of the vehicle or any other suitable support, as will be readily understood. On these shafts are slidably mounted the friction wheels 3 and 4, respectively, which rotate with the shaft by means of the feathers 5. The friction wheels are shiftable on their respective shafts for the purpose of obtaining various speeds and of changing the direction of rotation of the driven shaft. On opposite sides of the friction wheels are friction disks or idlers 6, which are rotatable on the short shafts 7 stationarily supported in bearings 8. The inner ends of the shafts 7 extend into hub extensions 9 on the friction disks 6, which are provided with bushings 10. The opposed faces 11 of the disks are preferably flat, and the peripheral surfaces of the wheels 3 and 4 are cylindrical, so as to engage with the flat gripping faces of the disks.

The inner ends of the driving and driven shafts meet at a point one side of the common axis of the friction disks, the driving shaft extending inwardly between the disks from one side and terminating short of the center, while the driven shaft extends inwardly from the opposite side and past the center, so that the driven friction wheel 4 can operate on either side of the center of rotation of the disks, thereby permitting a forward or reverse rotation of the driven shaft. In order to support one shaft on the other, the driven shaft is preferably tubular, and the driving shaft is reduced at its inner end so as to extend into the bore 12 of the driven shaft. The inner end of the driven shaft and the shoulder 13 of the driving shaft are provided with annular grooves 14 forming a race for the anti-friction balls 15, as shown more clearly in Fig. 2.

To throw the device into and out of operation, the friction disks 6 are mounted to have a limited movement on their respective shafts 7, so that the friction wheels can be clutched or unclutched between the gripping surfaces 11. For this purpose, a suitable clearance is provided between the inner or bottom walls 16 of the bores of the hubs 9 and the inner ends of the stationary shafts 7. To move the friction disks laterally toward each other, so as to clutch the friction wheels 3 and 4, any suitable mechanism may be employed, such, for instance, as the operating lever 17 having bifurcations or arms 18 which span the device and journal at their ends on the shafts 7, so that the lever can swing back and forth on the latter as a center. Between the fulcrumed ends of the arms 18 and each adjacent friction disk is a suitable means for producing axial movement of the disks by the angular movement of the lever. Each of said means comprises, preferably, a collar 19 secured to its respective shaft 7 by a spline 20, as shown at the top of Fig. 2, so as to have a limited longitudinal movement. The outer transverse surface of the collar 19 is provided with two semi-annular cams or wedges 21 over which ride the friction rollers 22 on the adjacent arm 18 of the operating lever 17. As the operating lever 17 is tilted, the collars 19 are moved by reason of the cam surfaces 21 engaging the rollers 22, so that the friction disks are moved toward each other or permitted to move apart out of engagement with the friction wheels. The collars 19 are each provided with a cylindrical flange 23 which extends inwardly over the outer end of the adjacent hub extension 9. Disposed between each collar and adjacent hub extension is a ball bearing 24 that is housed by the cylindrical flange 23 of the collar. By means of these ball bearings, the friction disks can freely rotate on their respective shafts with comparatively little friction. A suitable latch and toothed sector mechanism will be provided on the vehicle at a point conveniently accessible to the driver, so as to lock the operating lever 17 in any desired position.

The friction wheels 3 and 4 are each preferably constructed of spaced parallel plates or disks 25 between which are arranged the sheet metal laminæ 26, the several parts being secured together by bolts 27, as shown in Fig. 2. On each one of the disks 25 is a hub 28 which has an extension 29 provided with a peripheral groove 30. Any suitable mechanism may be provided for shifting the friction wheels 3 and 4 to obtain various speed relations and to reverse the direction of rotation. One means for accomplishing this comprises a lever 31 fulcrumed upon a suitable part of the casing 32, a portion of which is shown in Fig. 1, the lower end of the lever being preferably, although not necessarily, bifurcated to straddle the shafts 1 and 2 and extend below the same. Pivoted to the lower end of the lever 31, but on opposite sides of the shafts 1 and 2 and extending in opposite directions are two links 33, the upper link having a hinged connection with a collar or band 34 located in the peripheral groove 30 of the hub of the friction wheel 3. A similar connection is made between the lower link 33 and a collar or band 34 with the friction wheel 4. The lever 31 is actuated by a rod 35 attached to any approved mechanism at the driver's seat, as will be readily understood. A careful inspection of the drawing will disclose the fact that the connection between the lever 31 and the friction wheel 4 is at a greater distance from the pivotal point of said lever than is the connection of the friction wheel 3 thereto; hence, it follows that when the wheels are caused to traverse the friction disks 6, the friction wheel 4 will travel at greater speed than will the friction wheel 3. This is necessary because the range of movement of the friction wheel 4 is greater than that of friction wheel 3, the former wheel moving from the peripheries of the disks 6 to and across their common axis, while the wheel 3 remains at all times on one side of said axis. By this means the driven shaft 2 is caused to turn in the same direction or in reverse direction as the driving shaft 1.

From the foregoing description, taken in connection with the accompanying drawing, the advantages of the construction and of the method of operation will be readily understood. In operation, power is transmitted from the shaft 1 to the shaft 2 when the friction disks are in engagement with the friction wheels. This engagement is maintained by the operating lever 17 being held in set position. Assuming that the parts are in the position shown in Fig. 2, the driven shaft will be rotated in the direction opposite from the rotation of the driving shaft and approximately at the same speed. By shifting the friction wheels 3 and 4 to the full line position shown in Fig. 1, the speed of the driven shaft will be reduced and the transmission of power increased, and by continuing this movement, the driven shaft will be finally reversed. With a mechanism of the class described, a smooth gradation of speed over a wide range is readily obtained and the parts of the device can be readily clutched or unclutched when it is desired to stop or start the vehicle or other machinery to be driven.

I have described the principle of operation of the invention, together with the apparatus which I now consider to be the best embodiment thereof, but I desire to have it understood that the apparatus shown is merely illustrative, and that various changes may be made, when desired, as are within the scope of the claims.

What is claimed is:—

1. In a device of the class described, the combination of a driving shaft and a driven shaft, a pair of friction disks, a friction wheel slidable on each shaft and adapted to engage said friction disks, and means for causing said wheels to traverse said disks at different speeds.

2. In a device of the class described, the combination of a driving shaft and a driven shaft, a pair of friction disks having plain parallel faces, a friction wheel slidable on each shaft and adapted to engage said friction disks, and means for causing said wheels to traverse said disks at different speeds.

3. In a device of the class described, the combination of a driving shaft and a driven shaft, a pair of frictions disks, a friction wheel slidable on each shaft and adapted to engage the faces of said friction disks, and means for simultaneously moving both friction wheels in the same direction, one of which is adapted to cross the axis of the friction disks.

4. In a device of the class described, the combination of a driving shaft and a driven shaft, a pair of friction disks having plain parallel faces and rotatable on the same axial line, a friction wheel slidable on each shaft and adapted to engage said friction disks, a pivoted operating lever extending below said shafts, and means connected to said lever above and below said shafts and to said friction wheels for sliding them on said shafts.

5. In a device of the class described, the combination of a driving shaft and a driven shaft, a pair of friction disks having plain parallel faces and rotatable on the same axial line, a friction wheel slidable on each shaft and adapted to engage said friction disks, a pivoted operating arm extending below said shafts, a loose ring on the hub of each wheel, and a link pivoted to each ring and to said lever, one link being above and the other below said shafts.

6. In a device of the class described, the combination of a driving shaft and a driven shaft, a pair of friction disks having plain parallel faces and rotatable on the same axial line, a friction wheel feathered on each shaft and adapted to engage said friction disks, a pivoted operating lever extending below said shafts, and means connected with said lever above and below said shafts and said friction wheels for sliding them on said shafts.

7. In a device of the class described, the combination of a driving shaft and a driven shaft in the same axial line, a pair of friction disks having plain parallel faces and rotatable on the same axial line, a friction wheel slidable on each shaft and adapted to engage said friction disks, a pivoted operating lever extending below said shaft and adapted to move said friction wheels at different speeds across the faces of said friction disks.

8. In a device of the class described, the combination of a driving shaft and a driven shaft in the same axial line, one of said shafts being journaled in the other, a pair of friction disks having plain parallel faces and rotatable on the same axial line at a right angle to the line of said driving and driven shafts, a friction wheel slidable on each shaft and adapted to engage said friction disks, a pivoted operating lever extending below said shafts and adapted to move said friction wheels across the faces of said friction disks, and means for sliding said disks on their shafts into and out of engagement with said friction wheels.

In testimony that I claim the foregoing as my own, I have hereto affixed my signature in the presence of two witnesses.

JOHN BERNHARDT RAHN.

Witnesses:
J. C. JENSEN,
LOUIS MOGENSEN.